(12) United States Patent
Racosky et al.

(10) Patent No.: US 10,725,237 B2
(45) Date of Patent: Jul. 28, 2020

(54) POLYMER COATED OPTICAL FIBER

(71) Applicant: Sonoro, LLC, Boulder, CO (US)

(72) Inventors: Michael Racosky, Boulder, CO (US); William Briggs, Willow Creek, CA (US); Fred Demetz, Rancho Cucamonga, CA (US); John Hull, Calgary (CA); Seyed Ehsan Jalilian, Calgary (CA)

(73) Assignee: Sonoro, LLC, Boulder, CO (US)

( * ) Notice: Subject to any disclaimer, the term of this patent is extended or adjusted under 35 U.S.C. 154(b) by 0 days.

(21) Appl. No.: 16/449,247

(22) Filed: Jun. 21, 2019

(65) Prior Publication Data

US 2019/0317273 A1    Oct. 17, 2019

Related U.S. Application Data

(63) Continuation of application No. 15/120,434, filed as application No. PCT/US2015/016664 on Feb. 19, 2015, now Pat. No. 10,330,862.
(Continued)

(51) Int. Cl.
*G02B 6/02* (2006.01)
*G01H 9/00* (2006.01)
(Continued)

(52) U.S. Cl.
CPC ........ *G02B 6/02395* (2013.01); *C03C 25/106* (2013.01); *C03C 25/1065* (2013.01); *C03C 25/26* (2013.01); *C03C 25/285* (2013.01); *C03C 25/323* (2013.01); *C03C 25/326* (2013.01); *G01H 9/004* (2013.01); *G02B 6/02033* (2013.01); *G02B 6/02076* (2013.01); *C03C 25/18* (2013.01)

(58) Field of Classification Search
CPC ............ G02B 6/02033; G02B 6/02076; G02B 6/02395; G02B 6/03694; C03C 25/106; C03C 25/1065; C03C 25/18; C03C 25/26; C03C 25/285; C03C 25/323; C03C 25/326; G01D 5/353
USPC ............ 385/12–13, 123–128; 264/1.24–1.29
See application file for complete search history.

(56) References Cited

U.S. PATENT DOCUMENTS 4,363,114 A    12/1982  Bucaro et al.
5,240,643 A     8/1993  Buckley et al.
(Continued)

OTHER PUBLICATIONS

International Search Report and Written Opinion of the International Searching Authority, dated May 20, 2015, for corresponding International Application No. PCT/US2015/016664, 10 pages.
(Continued)

*Primary Examiner* — Michael P Mooney
(74) *Attorney, Agent, or Firm* — Klarquist Sparkman, LLP

(57) ABSTRACT

Coated optical fibers and uses of such fibers as sensors in high temperature and/or high pressure environments. The coated optical fiber has improved sensing properties at elevated pressure and/or temperature, such as enhanced acoustic sensitivity and/or a reduced loss in acoustic sensitivity. The use of the coated optical fibers in various sensing applications that require operation under elevated pressure and/or temperature, such as, acoustic sensors for various geological, security, military, aerospace, marine, and oil and gas applications are also provided.

20 Claims, 6 Drawing Sheets

Related U.S. Application Data

(60) Provisional application No. 61/941,958, filed on Feb. 19, 2014.

(51) Int. Cl.

| | |
|---|---|
| *C03C 25/106* | (2018.01) |
| *C03C 25/1065* | (2018.01) |
| *C03C 25/26* | (2018.01) |
| *C03C 25/285* | (2018.01) |
| *C03C 25/323* | (2018.01) |
| *C03C 25/326* | (2018.01) |
| *C03C 25/18* | (2006.01) |

(56) References Cited

U.S. PATENT DOCUMENTS

| | | | | |
|---|---|---|---|---|
| 5,367,376 | A | * | 11/1994 | Lagakos ............... G01H 9/004 250/227.19 |
| 2003/0049446 | A1 | | 3/2003 | Schissel et al. |
| 2006/0083463 | A1 | | 4/2006 | Shaibani et al. |
| 2012/0093470 | A1 | | 4/2012 | Terruzzi et al. |
| 2012/0177319 | A1 | | 7/2012 | Alemohammad et al. |
| 2013/0065975 | A1 | | 3/2013 | Natsui et al. |
| 2016/0290083 | A1 | | 10/2016 | Takahashi et al. |

OTHER PUBLICATIONS

Dupont™ Hytrel® "Thermoplastic Polyester Elastomer, Product Reference Guide," printed from www.dupont.com/content/dam/dupont/products-and-services/plastic-polymers-and-resins/thermoplastics/documents/Hytrel/Hytrel%20Product%20Reference%20Guide.pdf (4 pages).

Dupont™ "Broader Product Line Focus on Loose Tubes and Tight Buffer Applications" and "Transportation & Advanced Polymers Portfolio for Optical Fiber Cables by Application," printed from http://www.dupont.com/content/dam/dupont/products-and-services/plastics-polymers-and-resins/thermoplastics/documents/General%20Design%20Principles/DuPont%20Broader%20Product%20Line%20Focus%20on%20Loose%20Tubes%20and%20Tight%20Buffer%20Applications.pdf (2 pages.).

"Shore (Durometer) Hardness Testing of Plastics," web page http://www.matweb.com/reference/shore-hardness.aspx> on Aug. 17, 2017 (3 pages.).

Dupont™ "Hytrel Thermoplastic Polyester Elastomers Design Guide," select pp. 1,2, and 30 retrieved from http://www2.dupont.com/Plastics/en_US/pfo/assets/downloads/hytrel/HDG112013.pdf on Aug. 17, 2017 (3 pages.).

Dupont™ "Hytrel 3078 Thermoplastic Polyester Elastomer," select pp. 1 and 5 retrieved from http://dupont.materialdatacenter.com/profiler/B0Ejv/material/pdf/datasheet/Hytrel3078> on Aug. 31, 2017 (2 pages.).

Dupont™ "Dupont Hytrel Rheology and Handling," select pp. 1 and 2 retrieved from http://www.dupont.com/content/dam/dupont/products-and-services/plastics-polymers-and-resins/thermoplastics/documents/Hytrel/Hytrel%20Rheology%20Handling%20Product%20Handling.pdf on Sep. 1, 2017, (2 pages.).

Office Action from the United States Patent & Trademark Office in co-pending U.S. Appl. No. 15/120,434, dated Sep. 8, 2017.

Office Action from the United States Patent & Trademark Office in co-pending U.S. Appl. No. 15/120,434, dated Jun. 15, 2018.

Notice of Allowance from the United States Patent & Trademark Office in co-pending U.S. Appl. No. 15/120,434, dated Feb. 28, 2019.

"Dupont Hytrel 7246 Thermoplastic Elastic Polymer" select pp. 1 and 5 retrieved from http://www.engpolymer.co.kr/product/hytrel/HYTREL7246.pdf> Feb. 16, 2019.

\* cited by examiner

A.

B.

A.

B.

POLYMER COATED OPTICAL FIBER

CROSS REFERENCE TO RELATED APPLICATIONS

This is a Continuation of U.S. patent application Ser. No. 15/120,434, filed Aug. 19, 2016, which is the U.S. National Stage of International Application No. PCT/US2015/016664, filed Feb. 19, 2015, which in turn claims the benefit of and priority to U.S. Provisional Application No. 61/941,958, filed Feb. 19, 2014, all of which are hereby incorporated by reference.

FIELD OF THE INVENTION

The present invention relates to the field of fiber optics and, in particular, to a polymer coated optical fiber suitable for use as a sensor in high temperature and/or high pressure operating conditions.

BACKGROUND OF THE INVENTION

Optical fibers find widespread use in acoustic sensors (Kirkendall & Dandridge, 2004, *J. Phys. D: Appl. Phys.* 37:R197-R216). Polymeric coatings over optical fibers are known to increase the acoustic sensitivity of the fiber (Hughes & Jarzynski, 1980, *Applied Optics*, 19(1):98-107; Giallorenzi et al., 1982, *IEEE J Quantum Engineering*, QE18, pp 626-665). Further enhancement of sensitivity has been demonstrated through the use of air-included polymer (AIP) coatings (Cole et al., 2002, *15th Optical Fiber Sensors Conf.* (Portland Oreg.) vol 15 *IEEE Catalog* 02EX533). AIP coatings, however, include air bubbles that collapse as operating pressures increase which significantly reduces the sensitivity enhancement. AIP coatings, therefore, are not suitable for high pressure applications.

Many fiber optic based sensors are required for applications that entail high temperature and/or high pressure operating conditions, such as downhole sensors in the oil and gas industry, deep water seismic exploration, nuclear reactor performance and safety monitoring, earthquake monitoring and localization, earthquake precursor alarm systems, detection of nuclear weapon test and/or treaty violations.

Commercially available electrical downhole sensor systems (without use of cooling or temperature isolation devices) are limited to use in downhole applications at temperatures of 110° C. or below. Various solutions for permitting use of optical fibers at high temperatures have been proposed, including commercially available coated and/or jacketed fibers (for example, from OFS (Specialty Photonics) and Fiberguide Industries).

U.S. Pat. No. 6,915,056 describes a buffer tube for optical fibers that is easily strippable and will not be subject to melting or sticking to other buffer tubes during the cable manufacturing process. The buffer tubes comprise a blend of at least 40% by weight of a copolyether elastomer, at least 10% by weight of an amorphous thermoplastic polymer and at least 10% by weight of a rubbery modifier. Preferred copolyether elastomers include Hytrel® thermoplastic elastomers, particularly Hytrel® grade G5544.

U.S. patent application Ser. No. 13/414,157 (US 2012/0227504) provides an alternative to coated fibers in the form of a sensor array suitable for underwater use that comprises a cladded core, a polymer layer disposed on the cladded core, an optical fiber wound around the polymer layer and a second polymer layer disposed over the initial polymer layer and the optical fiber. Exemplary polymers described are polyether urethanes and polyester urethanes.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention relates generally to polymer coated optical fibers and sensor systems comprising same. One aspect of the invention relates to a coated optical fiber comprising: an optical fiber, and a polymeric coating over the optical fiber, the polymeric coating comprising a thermoset, thermoplastic or UV cured elastomer having a Poisson's Ratio of between about 0.350 and about 0.4995, and a shear modulus of between about 20 psi and about 2900 psi.

Another aspect of the invention relates to an acoustic sensor system comprising a coated optical fiber as described above.

Another aspect of the invention relates to a method of producing a coated optical fiber having an increased Sensitivity Scale Factor of between about 5 dB and about 60 dB over bare fiber, the method comprising coating an optical fiber with a thermoset or thermoplastic elastomer, the thermoset or thermoplastic elastomer having a Poisson's Ratio of between about 0.350 and about 0.4995, and a shear modulus of between about 20 psi and about 2900 psi.

Another aspect of the invention relates to a system for detecting acoustic changes in a channel, the system comprising a coated optical fiber as described above.

Another aspect of the invention relates to a system for detecting acoustic changes in a channel, the system comprising at least one coated optical fiber, an interrogator optically coupled to the coated optical fiber and a signal processing device in communication with the interrogator, wherein the coated optical fiber comprises an optical fiber having a polymeric coating, the polymeric coating comprising a thermoset, thermoplastic or UV cured elastomer having a Poisson's Ratio of between about 0.350 and about 0.4995, and a shear modulus of between about 20 psi and about 2900 psi.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1A:
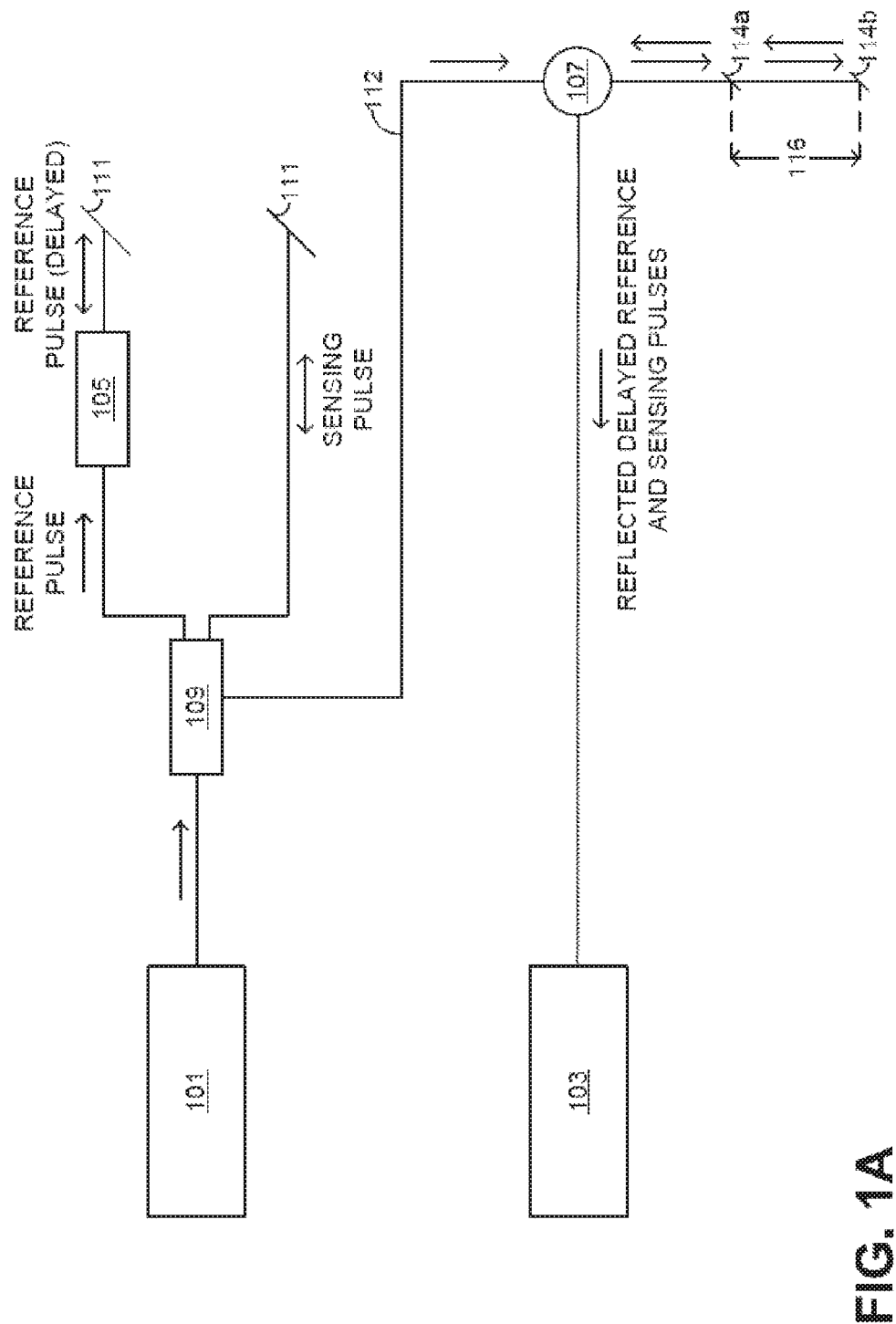
FIG. 1A-D present schematic diagrams of a sensor system comprising polymer coated optical fiber that includes Fiber Bragg Gratings (FBGs) in one embodiment of the invention.

The present invention relates generally to coated optical fibers and uses of such fibers as sensors in high temperature and/or high pressure operating environments. Certain characteristics are defined herein that allow selection of a suitable polymer, such as a thermoset, thermoplastic or UV cured elastomer that, when used to coat an optical fiber, will impart on the fiber improved sensing properties at elevated pressure and/or temperature. In certain embodiments, the defined characteristics include Poisson's Ratio and one or more elastic moduli, such as shear modulus, Young's modulus or bulk modulus. In certain embodiments, the defined characteristics include Poisson's Ratio and shear modulus. In some embodiments, the defined characteristics include Poisson's Ratio and shear modulus, Young's modulus and/or bulk modulus.

In certain embodiments, the enhanced sensing properties comprise an enhanced acoustic sensitivity and/or a reduced loss in acoustic sensitivity. The improved acoustic sensing properties of the coated optical fibers allows for their use in various sensing applications that require operation under elevated pressure and/or temperature, including, but not limited to, acoustic sensors for various geological, security, military, aerospace, marine, and oil and gas applications.

In certain embodiments, the enhanced sensing properties comprise improved vibration sensitivity such that the polymer coated fibers may find use as inertial sensors, such as accelerometers and/or velocity sensors. In some embodiments, the enhanced sensing properties allow for use of the polymer coated optical fibers as sensors to measure temperature and pressure as a function of well depth.

In certain embodiments, the enhanced sensing properties comprise stable or enhanced thermal expansion coefficient such that the polymer coated fibers may find use as temperature sensors to provide an important measurement in high temperature well environments.

Definitions

Unless defined otherwise, all technical and scientific terms used herein have the same meaning as commonly understood by one of ordinary skill in the art to which this invention belongs.

As used herein, the term "about" refers to an approximately +/−10% variation from a given value. It is to be understood that such a variation is always included in any given value provided herein, whether or not it is specifically referred to.

The term "plurality" as used herein means more than one, for example, two or more, three or more, four or more, and the like.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, use or method, denotes that additional elements and/or method steps may be present, but that these additions do not materially affect the manner in which the recited composition, method or use functions. The term "consisting of" when used herein in connection with a composition, use or method, excludes the presence of additional elements and/or method steps. A composition, use or method described herein as comprising certain elements and/or steps may also, in certain embodiments consist essentially of those elements and/or steps, and in other embodiments consist of those elements and/or steps, whether or not these embodiments are specifically referred to.

The abbreviation "um" used herein denotes micrometers.

Coated Optical Fibers

In a broad aspect, the coated optical fiber comprises an optical fiber having a polymeric coating having defined characteristics. In certain embodiments, the polymeric coating comprises thermoset, thermoplastic or UV cured elastomer. In some embodiments, the polymeric coating comprises a thermoset or thermoplastic elastomer.

Optical fibers typically include a transparent core surrounded by a transparent cladding material with a lower index of refraction. Light is kept in the core by total internal reflection, allowing the fiber to act as a waveguide. The term "cladded core" is used herein to describe the transparent core and cladding material typically comprised by optical fibers. Accordingly, in certain embodiments, the coated optical fiber comprises an optical fiber having a cladded core and a polymeric coating over the cladded core.

The optical fiber may be a custom made or commercially available optical fiber. Both glass and plastic optical fibers are contemplated in certain embodiments. Various glass and plastic optical fibers are commercially available, for example, from manufacturers such as Corning Optical Fibers (New York), Fibercore Limited (UK), Draka Communications (Prysmian Group—Milan, Italy).

In certain embodiments, the optical fiber is a quartz glass (amorphous $SiO_2$) fiber. The glass optical fiber may optionally be doped with a rare earth compound, such as germanium, praseodymium, or erbium oxides. Both single mode and multimode optical fibers are contemplated in certain embodiments. Exemplary, non-limiting, optical fibers include ClearCurve™ fibers (bend insensitive), SMF28 series single mode fibers such as SMF-28 ULL fibers or SMF-28e fibers, InfiniCor® series multimode fibers, and various fibers available from Fibercore Limited (UK).

Typically, commercially available optical fibers will include a primary coating. In certain embodiments, optical fibers having an acrylate or polyimide primary coating are employed with the polymer coating being applied over the primary coating. Preferably the primary coating will be stable at temperatures up to at least 150° C. In some embodiments relating to high temperature applications, the primary coating may be stable at temperatures up to at least about 320° C. Polyimide primary coatings are particularly suitable for high temperature applications. High temperature acrylates are also available. In certain embodiments, the fiber may include a secondary coating of acrylate or polyimide with the polymer coating being applied over the secondary coating. For example, the optical fiber may include a primary coating of soft acrylate and a secondary coating of hard acrylate. Optical fibers comprising a primary and optional secondary coating as described above are available from a number of commercial sources including, for example, Fibercore Limited (UK), Draka Communications (Prysmian Group—Milan, Italy).

In certain embodiments, the use of pure silica or silica clad optical fibers is contemplated.

In certain embodiments, the optical fiber will have a diameter of between about 50 um and about 200 um, including any primary and secondary coatings. In some embodiments, optical fibers with a diameter of at least about 50 um, 60 um, 70 um or 80 um, or any amount therebetween are employed. Upper limits for the diameter of the optical fiber in various embodiments may be about 200 um, 150 um, 140 um, 130 um or 125 um, or any amount therebetween. In some embodiments, the diameter of the optical fiber may be between about 50 um and about 150 um, between about 50 um and about 140 um, between about 50 um and about 130 um, between about 50 um and about 125 um, between about 60 um and about 150 um, between about 70 um and about 150 um, or between about 80 um and about 150 um.

Figure 3:
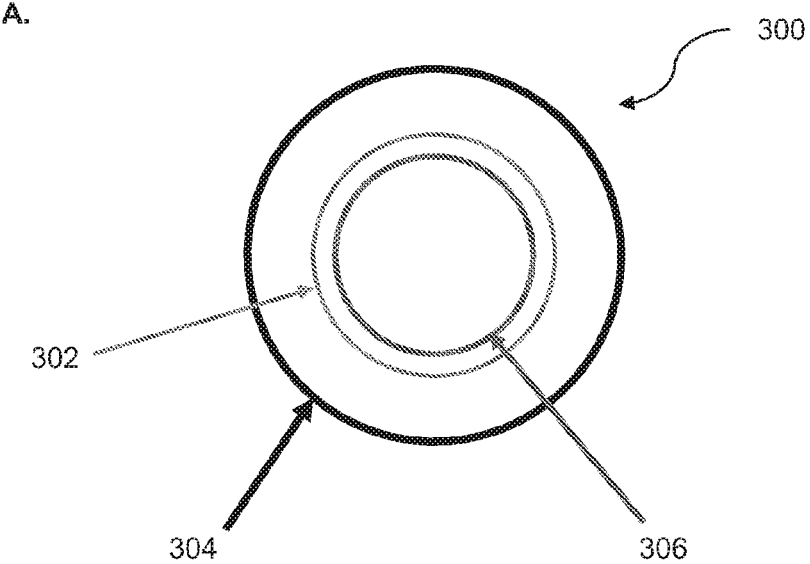
FIG. 3 shows schematic cross-sections of (a) an exemplary coated optical fiber having a single primary coating, and (b) an exemplary coated optical fiber having a primary and secondary coating, under a coating of thermoplastic, thermoset or UV cured elastomer.
Figure 3:
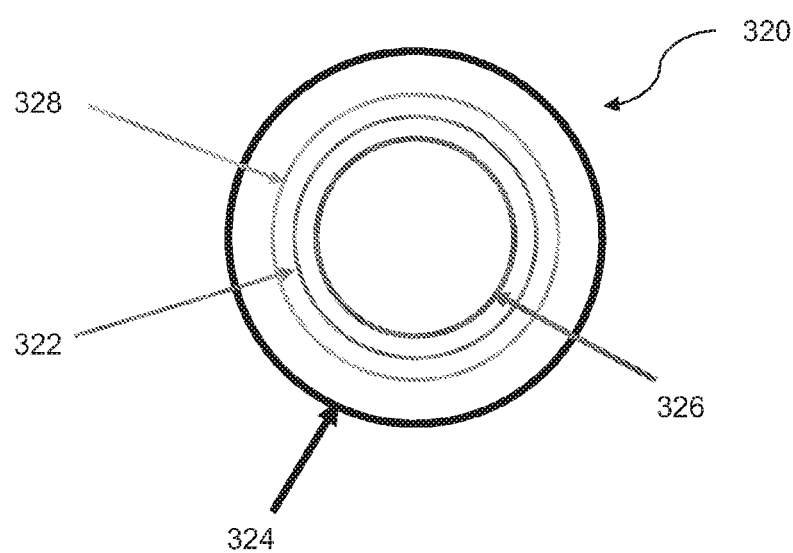

FIG. 3 provides schematic cross-sections of two exemplary embodiments of a coated optical fiber. FIG. 3(a) shows a coated optical fibre 300 having a cladded core 306, a primary coating 302 of acrylate or polyimide and a thermoset or thermoplastic elastomer coating 304. In this specific embodiment, the cladded core 306 may have a diameter of about 80 um and with the primary coating 302 has an outside diameter of about 140 um. A thermoset, thermoplastic or UV cured elastomer coating 304 is applied, for example by extrusion, over the primary coating 302 to a final diameter within the ranges described herein, for example, about 1500 um.

FIG. 3(b) shows a coated optical fibre 320 having a cladded core 326, a primary coating 322 of soft acrylate, a secondary coating of hard acrylate 328 and a thermoset, thermoplastic or UV cured elastomer coating 324. In this specific embodiment, the cladded core 326 may have a diameter of about 80 um. A thermoset, thermoplastic or UV cured elastomer coating 324 is extruded over the primary and secondary coatings 322, 328 to a final diameter within the ranges described herein, for example, between about 900 nm and about 1500 um.

In certain embodiments, the optical fiber comprises Fiber Bragg's Gratings (FBGs). The FBGs may be written into the optical fiber or spliced into the optical fiber at specific locations as is known in the art. One skilled in the art will appreciate that an FBG is a type of distributed Bragg reflector constructed in a short section of optical fiber that reflects particular wavelengths of light and transmits all others. Groups of the FBGs may be located along the length of the fiber. Adjacent pairs of FBGs form a series of interferometers that may be interrogated with a Time Division Multiplexing demodulator or similar device.

The polymeric coating is applied over the optical fiber and optional primary and secondary coatings. The polymeric coating has certain defined characteristics allowing for increased sensitivity or reduced loss in sensitivity at elevated temperature and/or pressure, for example increased or reduced loss in acoustic sensitivity. Elevated temperature as used herein in this context refers to a temperature above about 100° C. In certain embodiments, an elevated temperature may refer to a temperature above about 150° C., above about 200° C., or above about 250° C. Elevated temperature ranges may be, for example, between about 100° C. and about 300° C., between about 150° C. and about 300° C., between about 200° C. and about 300° C., or between about 250° C. and about 300° C. Elevated pressure as used herein refers to a pressure above atmospheric pressure. In certain embodiments, elevated pressure may refer to a pressure up to about 30,000 psig, for example, up to about 20,000 psig, or up to about 10,000 psig.

In certain embodiments, the polymeric coating comprises a thermoset, thermoplastic or UV cured elastomer having defined characteristics that include Poisson's Ratio and one or more elastic moduli, such as shear modulus, Young's modulus or bulk modulus. One skilled in the art will appreciate that as shear modulus, Young's modulus or bulk modulus are all elastic moduli, these characteristics of the polymer are interrelated and that while certain polymers are defined herein by their shear modulus, they may alternatively be characterized by defining their Young's modulus and/or bulk modulus.

In certain embodiments, the polymeric coating comprises a thermoset, thermoplastic or UV cured elastomer having defined characteristics that include Poisson's Ratio and shear modulus.

In certain embodiments, the polymeric coating comprises a thermoset, thermoplastic or UV cured elastomer having a Poisson's Ratio of between about 0.350 and about 0.4995, and a shear modulus of between about 20 psi and about 2900 psi. In certain embodiments, the polymeric coating comprises a thermoset, thermoplastic or UV cured elastomer having a Poisson's Ratio of between about 0.455 and about 0.495, between about 0.455 and about 0.490, between about 0.460 and about 0.495, between about 0.465 and about 0.495, between about 0.450 and about 0.485, between about 0.450 and about 0.480, between about 0.455 and about 0.485, or between about 0.455 and about 0.480. In certain embodiments, the polymeric coating comprises a thermoset, thermoplastic or UV cured elastomer having a Poisson's Ratio of between about 0.460 and about 0.480. In some embodiments, the polymeric coating comprises a thermoset, thermoplastic or UV cured elastomer having a Poisson's Ratio of about 0.490 or less, and a shear modulus of between about 20 psi and about 2900 psi. In some embodiments, the polymeric coating comprises a thermoset, thermoplastic or UV cured elastomer having a Poisson's Ratio of about 0.480 or less, and a shear modulus of between about 20 psi and about 2900 psi.

Poisson's Ratio may be measured, for example, as described in ASTM D638. In certain embodiments, reference to a Poisson's Ratio means a Poisson's Ratio measured in accordance with ASTM D638. Shear modulus may be measured, for example, as described in ASTM E143. In certain embodiments, reference to a shear modulus means a shear modulus measured in accordance with ASTM E143.

Young's modulus, also known as the elastic modulus or modulus of elasticity, can be experimentally determined from the slope of a stress-strain curve created during tensile tests (see ASTM D412) conducted on a sample of the material. The slope of the stress-strain curve at any point is the tangent modulus and the tangent modulus of the initial, linear portion of the stress-strain curve is the Young's modulus.

Bulk modulus of a polymer measures the polymer's resistance to uniform compression and is defined as the ratio of the infinitesimal pressure increase to the resulting relative decrease of the volume. One method of measuring a material bulk modulus is to measure the material density and the material sound speed in water (bulk modulus $(K)=RhoC^2$).

The polymer comprised by the polymeric coating should be selected such that it is hard enough not to suffer permanent plastic deformation at the higher pressures and temperatures, which may degrade the acoustic response enhancement. It is contemplated that polymers having a Shore A hardness of between about 20 and about 95 will be most appropriate, although polymers having a hardness slightly above or below this range are also contemplated. In certain embodiments, the thermoset, thermoplastic or UV cured elastomer comprised by the polymeric coating has a Shore A hardness of between about 20 and about 95. In some embodiments, the polymeric coating comprises a thermoset, thermoplastic or UV cured elastomer having a Shore A hardness of between about 30 and about 90, between about 30 and about 85, between about 35 and about 85, between about 40 and about 85, between about 45 and about 85, between about 50 and about 85, or between about 55 and about 85. In some embodiments, the polymeric coating comprises a thermoset, thermoplastic or UV cured elastomer having a Shore A hardness of at least about 60. Shore A hardness can be measured, for example, according to ASTM D2240. In certain embodiments, reference to a Shore A hardness means a Shore A hardness measured in accordance with ASTM D2240.

The exact nature of the thermoset, thermoplastic or UV cured elastomer included in the polymeric coating will be dependent on the end use of the coated optical fiber but the thermoset, thermoplastic or UV cured elastomer will in all cases meet the above-described Poisson's Ratio and shear modulus requirements and/or equivalent bulk modulus and Young's modulus values to achieve the enhanced sensitivity. One skilled in the art provided with the required characteristics, could readily select an appropriate polymer. Examples of polymers that may be employed include, but are not limited to, certain Hytrel® polymers, various silicones, polyether thermoplastic elastomer (TPUs), polyester TPUs, and thermoplastic elastomers (TPEs) from Dow Chemical, BASF (for example, Elastolan) and Bayer Material Sciences (such as Desmopan® and Texin®—High-Tech Thermoplastic Polyurethanes), and UV cured polymers from Cytec Industries, Inc (Woodland Park, N.J.).

In certain embodiments in which the coated fiber is to be used underwater or in wet or damp environments, the elastomer should also be hydrolytically stable. Examples of suitable hydrolytically stable polymers include, but are not limited to, certain grades of Hytrel® polymers, various silicones, and polyether TPUs. Optical glass fiber sensor reliability can be seriously degraded by direct contact with water. The use of a hydrolytically stable polymer in accordance with certain embodiments of the invention may, therefore, reduce the fiber failure rate in wet or damp environments, such as well-bore environments.

In certain embodiments, a thermoset elastomer may be used. Thermoset elastomers, amongst others, may be particularly useful for high temperature applications, for example, at operating temperatures up to about 300° C. Non-limiting examples of thermoset elastomers for such applications include various silicones. Silicones suitable for coating materials are known in the art and include, but are not limited to, peroxide cured silicones and platinum cured silicones, Suitable silicones are commercially available from companies such as Momentive (Columbus, Ohio) and Dow Corning Corporation (Midland, Mich.).

In certain embodiments, a hybrid elastomer may be used. Hybrid elastomers, amongst others, may be particularly useful for high temperature applications, for example, at operating temperatures up to about 300° C. Non-limiting examples of hybrid elastomers for such applications include fluoroelastomers (also known as rubberized Teflons). Fluoroelastomers suitable for coating materials are known in the art and include, but are not limited to, Kalrez from E.I. DuPont (Wilmington, Del.), and AFLAS from Asahi Glass Co Ltd, (Chiyoda, Tokyo).

In certain embodiments, a thermoplastic elastomer may be used. Thermoplastic elastomers, amongst others, are particularly useful where the end application does not require very high temperature stabilities. For example, a thermoplastic elastomer that is stable at operating temperatures up to about 150° C. In such applications, thermoplastic elastomers may provide better sensitivity than thermoset elastomers, although the latter are also suitable for use at these temperatures. A non-limiting example of a thermoplastic elastomer for such applications is a polyester-polyether copolymer, such as a Hytrel® polymer. Examples of suitable Hytrel® polymers include Hytrel® 3078, Hytrel® G3548L, Hytrel® G4078W, Hytrel® 4056, Hytrel® 4069 and Hytrel® 4556.

In certain embodiments, the polymer is extrudable in order to facilitate coating of the optical fiber, although other methods of applying the polymer are also contemplated. Examples of suitable extrudable elastomers include, but are not limited to, certain Hytrel® polymers, various silicones, polyether thermoplastic elastomer (TPUs), polyester TPUs, and thermoplastic elastomers (TPEs) from Dow Chemical, BASF (for example, Elastolan) and Bayer Material Sciences (such as Desmopan® and Texin®—High-Tech Thermoplastic Polyurethanes).

In certain embodiments, the polymeric coating may be selected to be substantially transparent. Such transparency will allow for visual inspection of the fiber for breaks or anomalies and, when the fiber comprises FBGs, for the location and/or integrity of the FBGs. Various silicones are available that are substantially transparent.

In certain embodiments, the polymeric coating may be coloured to allow for easy identification of the coated fibers. A dye may be used that would maintain some transparency or a pigment may be added that would substantially eliminate the base polymer transparency.

The final thickness of the polymer coating on the optical fiber will be dependent on the initial diameter of the optical fiber employed and, in some cases, also on the end use of the coated fiber including whether it will be incorporated into a sub-assembly such as a cable or sensor array. Appropriate coating thicknesses for a given fiber or application can be determined by one skilled in the art. Typically, the final diameter of the coated fiber will be between about 100 um and about 4000 um, although final diameters of up to about 10,000 um are contemplated in certain embodiments, for example, those utilizing plastic optical fibers. For example, the outer diameter of the coated fiber may be from about 100 um, 150 um, 200 um, 250 um, 300 um, 350 um, 400 um or 450 um to about 4000 um, 3500 um, 3000 um or 2500 um. Exemplary ranges of outer diameters for the coated optical fiber include, but are not limited to, between about 500 um and about 4000 um, between about 500 um and about 3500 um, between about 500 um and about 3000 um, between about 500 um and about 2500 um, between about 500 um and about 2000 um, between about 500 um and about 1500 um, between about 750 um and about 2000 um, and between about 1000 um and about 2000 um. In certain embodiments, the final diameter of the coated optical fiber may be between about 900 um and about 2000 um, for example, about 1500 um.

The polymer coated optical fibers described herein may be manufactured according to known techniques. Typically, the polymer coating will be applied to the fiber as a concentric coating by techniques such as extrusion, pultruding or molding using conventional equipment. In some embodiments, the polymer coating may be extruded onto the fiber using conventional extruders suitable for extrusion of thermoplastic or thermoset elastomers, or may be applied by industry known processes for applying UV cured polymers to fibers and/or conductors. One or more post- or in-process elevated temperature curing steps and/or cooling steps may be included if necessary. One or more UV curing steps may also be included in some embodiments.

Optical fibers coated as described above have improved acoustic sensing properties under condition of elevated pressure and/or temperatures, such as enhanced acoustic sensitivity and/or a reduced loss in acoustic sensitivity. In certain embodiments for example, the coated optical fibers as described herein show an enhanced Sensitivity Scale Factor of between about 5 dB and about 60 dB over bare fiber in a similar configuration, for example between about 5 dB and about 55 dB, or between above 5 dB or about 50 dB, over bare fiber in a similar configuration. In certain embodiments, the polymer coated optical fibers described herein also have an improved durability, making them particularly suited for use in harsh conditions, such as downhole and deep well applications.

The improved sensing properties of the polymer coated optical fibers allow for their use as acoustic sensors in a variety of applications including, for example, geological, security, military, aerospace, marine, and oil and gas applications. In particular, the polymer coated fibers may find application in structural monitoring systems including for offshore drilling operations, nuclear reactor performance monitoring systems, seismic sensor systems, pipeline monitoring/intrusion detection and as downhole sensors in the oil and gas industry.

In certain embodiments, the invention relates to the use of the polymer coated fibers in fiber optic sensors for application in the geological exploration industry, for example, to monitor seismic return signals from external geophysical sound pulse sources. The sensors may be deployed subsurface or ocean bottom as line arrays. In certain embodiments, the sensors may be used in hot, subsurface environments to detect hydrocarbon locations the earth's strata. In this context, the improved acoustic properties of the polymer coated optical fibers may allow the detection of weaker seismic signals which enhance the seismic survey coverage range, and at higher temperatures and static pressures than other types of fiber optic sensors.

In certain embodiments, the invention relates to the use of the polymer coated fibers in fiber optic sensors for application in nuclear reactor monitoring, for example, to monitor reactor integrity, detect leaks, and the like. The sensors may be deployed inside or outside a channel (for example, inside or strapped to the outside of a casing). In certain embodiments, the sensors may be used in hot environments (for example, to detect gas or liquid leaks around the casings).

In certain embodiments, the invention relates to the use of the polymer coated fibers in fiber optic sensors for application in nuclear explosion monitoring. The coated optical fibers may allow for detection of fainter explosions, for example at a greater distance, due to the enhanced sensitivity.

In certain embodiments, the invention relates to the use of the polymer coated fibers in fiber optic sensors for application in seismic monitoring where the sensor can detect and localize earthquake activity. In some embodiments, the use of the coated optical fibers for detection of earthquake precursors for public alarm systems is contemplated, for example, through the deployment of a series of single coated fibers, each down a very small bore hole, along locations adjacent to a known fault line.

In certain embodiments, the invention relates to the use of the polymer coated fibers in fiber optic sensors for application in the above ground, surface, subsurface or underwater security monitoring. For example, the enhanced sensitivity of the coated fibers may allow for perimeter defence systems which can detect, classify, and localize a threat by measuring the spectral and temporal properties of sound waves, seismic ground vibrations, and/or airborne intruder sounds.

In certain embodiments, the invention relates to the use of the polymer coated fibers in fiber optic sensors for application in the oil and gas industry, for example, to monitor well integrity, detect pipeline leaks, monitor horizontal well production, monitor fracking processes, and the like. The sensors may be deployed inside or outside a channel (for example, inside or strapped to the outside of a casing). In certain embodiments, the sensors may be used in hot, deep oil well casings (for example, to detect gas or liquid leaks around the downhole well casings and concrete grouting), to detect reflections of sound waves directed into the earth's strata in the search for geological deposits of oil and gas, or to detect gas or oil leaks adjacent to a well bore. In this context, the improved acoustic properties of the polymer coated optical fibers may allow the detection of hydrocarbon reflections at much larger distances from the well bore containing the sensor and/or at higher temperatures than other types of fiber optic sensors without heat sensitive degradation associated with electrical downhole sensors or fiber sensors with low temperature coatings, and/or the detection and location of low level sound emanating from gas leaks outside the well casing.

Sensor Systems

Certain embodiments of the invention relate to sensor systems comprising the polymer coated optical fiber. The polymer coated optical fiber may be incorporated into a sensor array or assembly and/or wound around a hollow or solid mandrel, or incorporated as part of a cable assembly with other sensing and non-sensing components. For high pressure applications, sensor arrays or assemblies that do not include a mandrel, or which include a pressure-insensitive mandrel, are preferred. Various sensor arrays and assemblies are known in the art and include those described in U.S. Pat. No. 7,224,872, and U.S. Patent Application Publication Nos. 2012/0227504 and 2013/0167628. In certain embodiments, a sensor array, or hollow or solid fiber-wrapped mandrel may further comprise an outer protective jacket, for example, an acoustically transparent metal or polymer jacket. In certain embodiments, the polymer coated optical fiber is used in the sensor system without any additional coatings or jackets.

Typically, the sensor system will further comprise a light or laser source, a detector and a signal processor. The sensor system may optionally include other sensing components.

In certain embodiments, the sensor system comprises coated optical fibers that include groups of FBGs located along the length of the fiber.

FIG. 1A is a block diagram of an example of a system that uses optical interferometry for fiber optic sensing applications. Optical interferometry is a technique in which a light pulse that is emitted by an optical source is split into two separate pulses: a sensing pulse and a reference pulse. The optical source may be a coherent optical source, such as a laser. When optical interferometry is used for fiber optic sensing applications, the sensing and reference pulses are at least partially reflected back towards an optical receiver. Accordingly, in FIG. 1A, an optical source 101 emits a light pulse on to optical fiber 112. The light pulse passes through an optical coupler 109 and is split into the sensing and reference pulses, which are transmitted along two different optical fiber segments. The reference pulse is delayed using an optical delay line 105, and both the sensing and delayed reference pulses are reflected back to the optical coupler 109 and directed to another optical fiber segment that comprises a first pair of fiber Bragg gratings ("FBGs") via an optical circulator 107. The first pair of FBGs comprises first and second FBGs 114*a,b* (generally, "FBGs 114"). The first and second FBGs 114*a,b* are separated by a certain segment 116 of the optical fiber 112 ("fiber segment 116"). The light pulse has a wavelength identical or very close to the center wavelength of the FBGs 114, which is the wavelength of light the FBGs 114 are designed to partially reflect. The sensing and delayed reference pulses are accordingly each partially reflected by the FBGs 114a,b and return to the optical circulator 107, which directs them to the optical receiver 103. The optical delay line 105 is configured to delay the reference pulse such that the delayed reference pulse that reflects off the first FBG 114a (hereinafter the "reflected, delayed reference pulse") arrives at the optical receiver 103 simultaneously with the sensing pulse that reflects off the second FBG 114b (hereinafter the "reflected sensing pulse"), which permits optical interference to occur. While the FBGs 114 are used as partial reflectors of light pulses in the depicted embodiment, in alternative embodiments (not depicted) different types of partial reflectors may be used.

Figure 1B:
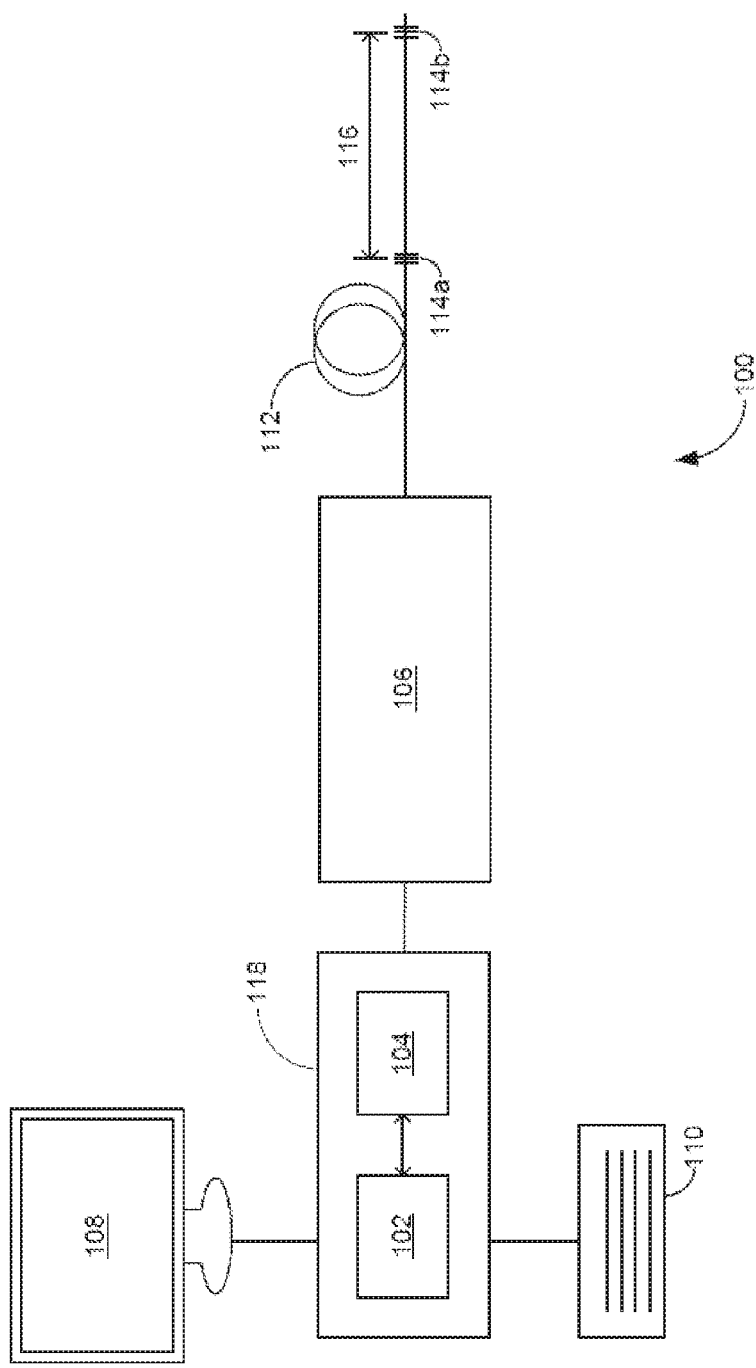
Figure 1C:
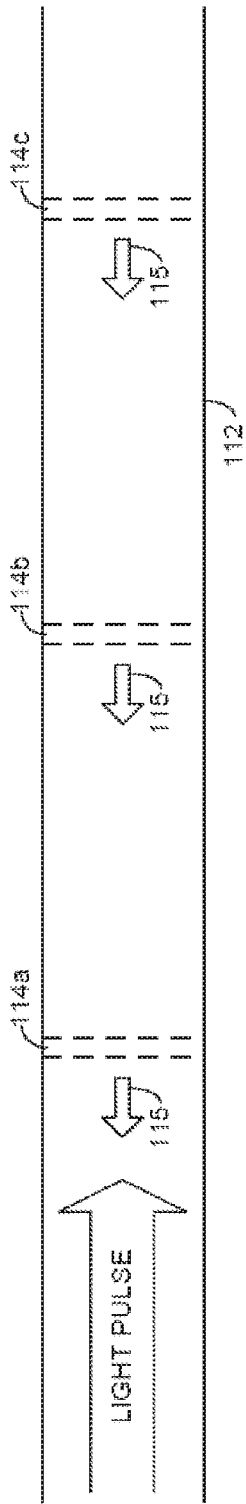

FIG. 1C depicts how the FBGs 114 reflect the light pulse, according to another embodiment in which the optical fiber 112 comprises a third FBG 114c. In FIG. 1C, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the optical receiver 101. In embodiments comprising three or more FBGs 114, the portions of the sensing and delayed reference pulses not reflected by the first and second FBGs 114a,b can reflect off the third FBG 114c and any subsequent FBGs 114, resulting in interferometry that can be used to detect strain along the fiber 112 occurring further from the optical source 101 than the second FBG 114b. For example, in the embodiment of FIG. 1C, a portion of the sensing pulse not reflected by the first and second FBGs 114a,b can reflect off the third FBG 114c and a portion of the delayed reference pulse not reflected by the first FBG 114a can reflect off the second FBG 114b, and these reflected pulses can interfere with each at the optical receiver 103.

Any changes to the optical path length of the fiber segment 116 result in a corresponding phase difference between the reflected, delayed reference pulse and the reflected sensing pulse at the optical receiver 103; however, these two pulses are superimposed at the optical receiver 103 and the phase difference between them therefore cannot be directly measured. Instead, the phase of the signal measured at the optical receiver 103 is determined relative to the phase of the reference signal, whose phase is known because the optical source 101 phase-modulates it by subjecting it to a time-dependent 0-2 π phase sweep. The relationship between the optical path of the fiber segment 116 and that phase difference (θ) is as follows:

$$\theta = \frac{2\pi n L}{\lambda}$$

where n is the index of refraction of the optical fiber; L is the optical path length of the fiber segment 116; and λ is the wavelength of the optical pulses. A change in L is caused by the fiber experiencing longitudinal strain induced by energy being transferred into the fiber. The source of this energy may be, for example, an object outside of the fiber experiencing dynamic strain, undergoing vibration, or emitting acoustics. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 1D:
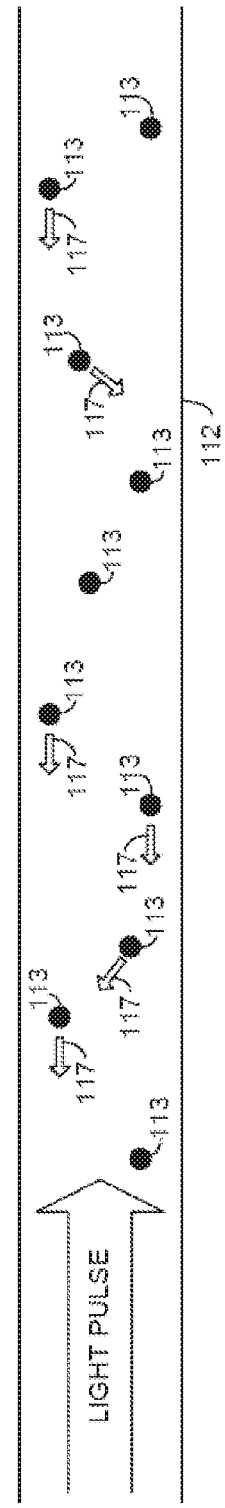

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1D, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated. DAS relies on interferometry using the reflected light to estimate the strain the fiber experiences. The amount of light that is reflected is relatively low because it is a subset of the scattered light 117. Consequently, and as evidenced by comparing FIGS. 1C and 1D, Rayleigh scattering transmits significantly less light back towards the optical source 101 than using the FBGs 114. DAS accordingly uses Rayleigh scattering to estimate the magnitude, with respect to time, of the strain experienced by the fiber during an interrogation time window, which is a proxy for the magnitude of the vibration or acoustics emanating from the region of interest. In certain embodiments, the sensor system is configured to utilize DAS.

In certain embodiments, the sensor system may be configured to measure dynamic strain by using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain.

In the depicted embodiments, groups of the FBGs 114 are located along the fiber 112. A typical FBG can have a reflectivity rating of 2% or 5%. In certain embodiments, the use of FBG-based interferometry to measure dynamic strain can offer several advantages over DAS, such as increased accuracy, precision, range, and response time.

Referring now to FIG. 1B, there is shown one embodiment of a system 100 for detecting dynamic strain of a conduit. The system 100 comprises the optical fiber 112, an interrogator 106 optically coupled to the optical fiber 112, and a signal processing device 118 that is communicative with the interrogator 106. While not shown in FIG. 1B, within the interrogator 106 are the optical source 101, optical receiver 103, optical delay line 105, and optical circulator 107.

The optical fiber 112 comprises one or more fiber optic strands, each of which is made from quartz glass (amorphous $SiO_2$). The fiber optic strands are doped with a rare earth compound, such as germanium, praseodymium, or erbium oxides) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and Infini-Cor® series multimode fibers.

Located on the optical fiber 112 are the FBGs 114 separated by the fiber segment 116, as discussed in respect of FIG. 1A above. Each of the FBGs 114a,b is tuned to reflect a substantially identical center wavelength of light; for example, typical FBGs 114 are tuned to reflect light in the 1.000 to 2.000 nm wavelength range. The length of the fiber segment 116 varies in response to dynamic strain that the optical fiber 112 experiences. While FIG. 1B shows only the one pair of FBGs 114a,b, in alternative embodiments (not depicted) any number of pairs of FBGs 114 may be on the fiber 112, and time division multiplexing (TDM) (and optionally wavelength division multiplexing (WDM)) may be used to simultaneously obtain measurements from them. If two or more pairs of FBGs 114 are used, any one of the pairs may be tuned to reflect a different center wavelength than any other of the pairs; in that example embodiment, WDM may be used in order to transmit and to receive light from the different pairs of FBGs 114, effectively extending the number of FBG pairs that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal; the use of sensing and reference pulses to cause this interference is discussed in more detail with respect to FIG. 1A, above. The strain that the fiber segment 116 experiences alters the optical path length between the two FBGs 114 and thus causes a phase difference to arise between the two interfering pulses. The resultant optical power at the optical receiver 103 can be used to determine this phase difference as described above with respect to FIG. 1A. Consequently, the interference pattern that the interrogator 106 records varies with the strain the fiber segment 116 is experiencing, which allows the interrogator 106 to estimate the strain the fiber segment 116 experiences from the received optical power. Suitable interrogators 106 are commercially available and include an Optiphase™ TDI7000. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 108 includes a processor 102 and a non-transitory computer readable medium 104 that are communicatively coupled to each other, and an input device 110 and a display 108 for interacting with the processor 102. The computer readable medium 104 has encoded on it statements and instructions to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics.

The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in the International (PCT) application PCT/CA2012/000018 (publication number WO 2013/102252), the entirety of which is hereby incorporated by reference.

In certain embodiments, the sensor system is a sensor system for use in oil and gas applications. For example, the sensor system may be configured for deployment inside or outside a channel for detecting fluid migration in an oil or gas well or in a pipeline, for monitoring well integrity, monitoring horizontal well production or monitoring fracking processes.

Fluid migration in oil or gas wells is generally understood to mean ingress or egress of a fluid along a vertical depth of an oil or gas well, including movement of a fluid behind or external to a production casing of a wellbore. The fluid may include gas or liquid hydrocarbons, including oil, as well as water, steam, or a combination thereof. A variety of compounds may be found in a leaking well, including methane, pentanes, hexanes, octanes, ethane, sulphides, sulphur dioxide, sulphur, petroleum hydrocarbons, oils or greases, as well as other odour-causing compounds. Some compounds may be soluble in water, to varying degrees, and represent potential contaminants in ground or surface water. Any sort of aberrant or undesired fluid migration is considered a leak and a sensor system, such as the one described herein, may be used to detect such leaks in order to facilitate repair of the leak. Such leaks can occur in producing wells or in abandoned wells, or wells where production has been suspended.

Figure 2:
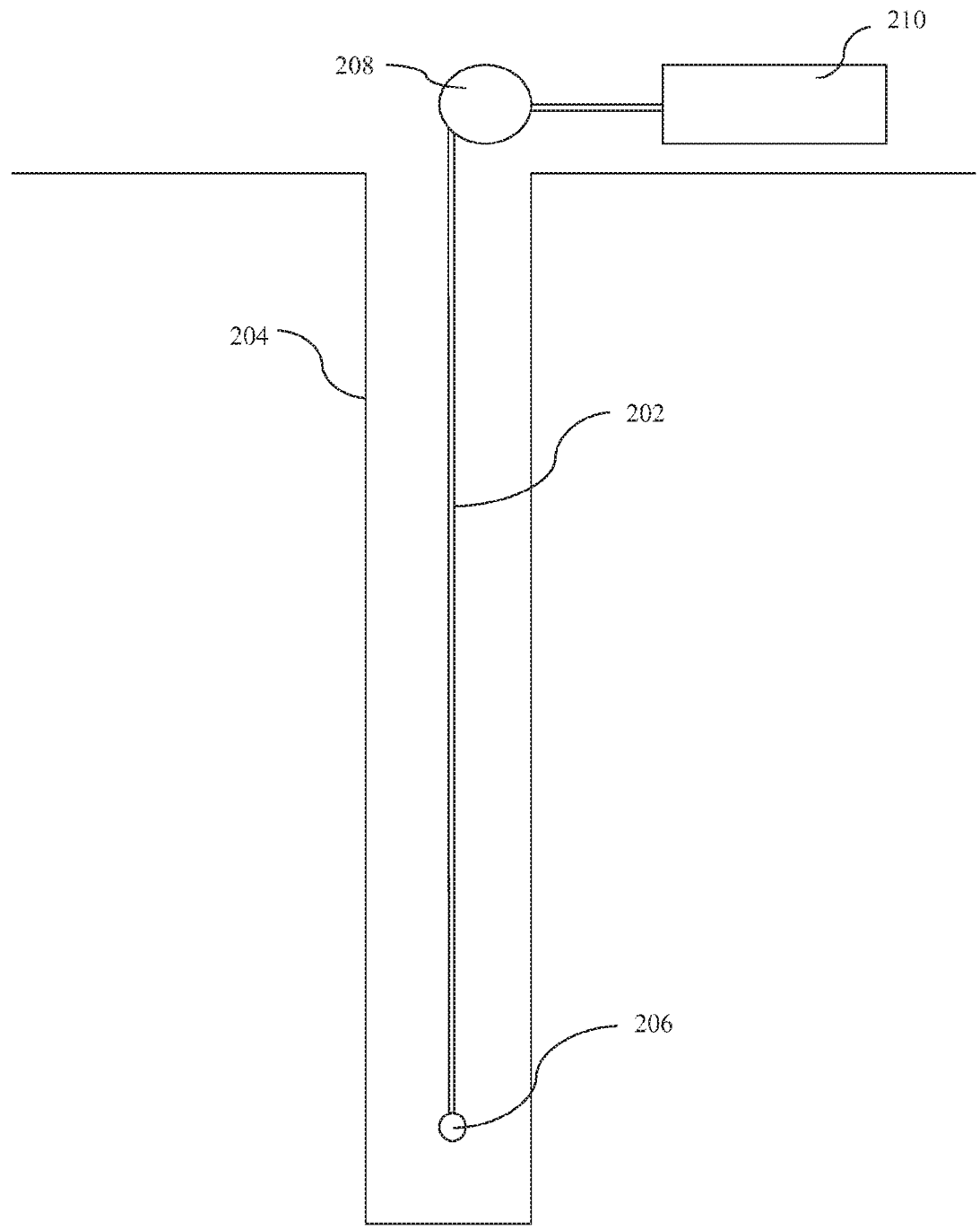
FIG. 2 is a schematic diagram of a sensor system for downhole applications comprising polymer coated optical fiber in one embodiment of the invention.

Suitable apparatus for deploying sensors in downhole applications are known in the art. FIG. 2 illustrates a sensing system comprising a polymer coated optical fiber as described herein deployed in an oil or gas well, or similar well, such as a geothermal well. In FIG. 2, a flexible fiber optic assembly 202 comprising at least one polymer coated optical fiber is deployed in the well bore 204. The fiber optic assembly includes a weight 206 coupled to the distal end of the assembly 202. The fiber optic assembly 202 is deployed into the well bore from a spool 208 that also stores the assembly 202 in coiled form when not in use. A motor (not shown) may be operationally coupled to the spool 208 and can be operated to deploy and retract the assembly 202. The fiber optic assembly 202 is in communication with optical signal processing equipment 210. Optical signal processing equipment 210 may include various electronics and optical components necessary to provide a light beam down the optical fiber, and to analyze the raw measurement data from the fiber optic assembly 202 and to convert these data into a form representative of the sensed acoustic signals that may be displayed, printed or further analyzed. Optical signal processing equipment 210 may optionally be configured to communicate with additional processing equipment, such as a computer or computer network. The communications may occur either over wires or other hard connections, including optical networks, or the communications may occur wirelessly.

The spool 208 and optical signal processing equipment 210 may optionally be housed on a trailer or other suitable vehicle such that the fiber optic assembly 202, spool 208 and optical signal processing equipment 210 form a mobile apparatus. Alternatively, the fiber optic assembly 202, spool 208 and optical signal processing equipment 210 can be configured for permanent or semi-permanent operation at a well bore site.

In FIG. 2, the coated optical fiber comprised by fiber optic assembly 202 may comprise FBGs each tuned to reflect an identical wavelength of light, and optical signal processing equipment 210 may comprise an interrogator optically coupled to the optical fiber assembly 202, and a signal processing device (as depicted in FIG. 1 as 106 and 118). The interrogator comprising a laser source for sending pulses of laser light along the fiber optic assembly 202 and a photodetector for detecting light that is reflected by the FBGs, and the signal processing device including a processor and a non-transitory computer readable medium that are communicatively coupled to each other, and an input device and a display for interacting with the signal processing device (as depicted in FIG. 1 as 108, 104, 102 and 110).

Methods of Manufacture

Certain embodiments of the invention relate to methods of manufacturing a coated optical fiber suitable for use in high pressure and/or high temperature operating environments, which includes selecting a thermoplastic, thermoset or UV cured elastomer having a Poisson's Ratio between about 0.350 and about 0.4995, and a shear modulus of between about 20 psi and about 2900 psi, and concentrically coating a glass or plastic optical fiber with the selected thermoplastic, thermoset or UV cured elastomer. The thermoplastic, thermoset or UV cured elastomer may be coated onto the fiber by extrusion, pultruding, molding or the like.

In certain embodiments, the thermoplastic, thermoset or UV cured elastomer polymer may be extruded onto the fiber. In some embodiments, the polymer coating may be extruded onto the fiber using conventional extruders suitable for extrusion of thermoplastic or thermoset elastomers. One or more post- or in-process elevated temperature or UV curing steps and/or cooling steps may be included if necessary.

In some embodiments, for coating with a UV cured polymer, fiber may be pulled through a bath of the polymer to create a wet, viscous cone shape of material on the fiber at a rate that produces the desired coating diameter. The uncured polymer on the fiber is then exposed to a UV light source that rapidly cures the polymer creating a solid coating on the fiber at the desired diameter. Adjustment of the final coating diameter can be obtained by changing the speed at which the fiber is pulled through the liquid bath. The higher the viscosity or the slower the fiber is pulled through the bath, the larger the coating finished diameter.

In some embodiments in which a thermoplastic or thermoset elastomer is extruded over the optical fiber, the extrusion process tension may be controlled to be low to moderate (for example, 20 to 150 gm) and to be constant (for example, +/−5 to 20 gm) depending upon the fiber and application. One skilled in the art will appreciate that additional care will need to be taken when coating fibers including FBGs, which can cause irregularities in the diameter of the fiber. In general, the diameter variation of the fiber with FBGs needs to be limited so that anomalies (lumps) over splices or recoated FBGs are small relative to the nominal diameter of the fiber. For larger fibers (for example, 125 um cladding and dual acrylate coatings to 245 um) the lump diameter divided by the nominal fiber diameter is typically kept to less than 1.2 For smaller fibers, the ratio may increase to as much as 1.35 for example. The extruder tooling and fiber handling equipment should be selected to accommodate the FBG lumps and maintain concentricity of the coating while also coating over the lumps without large tension variation.

In some embodiments in which a UV cured elastomer is coated over the optical fiber, the process of pulling the fiber through a liquid viscous bath must maintain a tension controlled to be low to moderate (for example, 20 to 150 gm) and to be constant (for example, +/−5 to 20 gm) depending upon the fiber and application. This coating process is less sensitive to fiber diameter variation but one skilled in the art will appreciate that additional care may still need to be taken when coating fibers including FBGs. Accordingly, the tooling and fiber handling equipment should be selected to accommodate the FBG lumps and maintain concentricity of the coating while also coating over the lumps without large tension variation.

In some embodiments, the thermoset, thermoplastic or UV cured elastomer also has a Shore A hardness of between about 20 and about 95. In some embodiments, the thermoplastic or thermoset elastomer may be a Hytrel® polymer or a silicone.

In some embodiments, the optical fiber comprises an acrylate or polyimide primary coating and the selected thermoplastic or thermoset elastomer or UV-cured polymer is extruded or otherwise applied over the primary coating. In some embodiments, the optical fiber may have a diameter of between about 50 um and about 200 um. In some embodiments, the optical fiber comprises FBGs written onto or spliced into the fiber.

In some embodiments, the selected thermoplastic or thermoset elastomer is extruded over the optical fiber to a final diameter of between about 100 um and about 4000 um, for example, between about 500 um and about 4000 um, between about 500 um and about 2500 um, or about 1500 um.

In some embodiments, the fiber is pulled thru a polymer bath and UV cured to create a final diameter of between about 100 um and about 4000 um, for example, between about 500 um and about 4000 um, between about 500 um and about 2500 um, or about 1500 um.

In certain embodiments, the coating on the fiber facilitates the use of automatic sensor manufacturing techniques through the increased robustness of the coated fiber, which facilitates the use of sensor spooling and tension monitoring required in automatic sensor winding machines, and minimizes touch labor requirements which are prevalent in current fiber optic sensor manufacturing. For example, the coated fiber manufacturing process using a Hytrel® 3078 or silicone SE9058 coated fiber as described in the Examples herein has demonstrated the fabrication of over 30 sensors in a single continuous array string in approximately 1/10 the labor time of single sensor manufacturing techniques.

To gain a better understanding of the invention described herein, the following examples are set forth. It will be understood that these examples are intended to describe illustrative embodiments of the invention and are not intended to limit the scope of the invention in any way.

EXAMPLES

Example 1: Preparation of Coated Fibers

The following coated fibers were prepared. The fibers were all commercially available glass/fused silica quartz fibers.

80 um glass fiber with acrylate coating and Hytrel® 3078 buffering to 1500 um.

80 um glass fiber with high temperature acrylate coating and Hytrel® 3078 buffering to 1500 um.
125 um glass fiber with acrylate coating and Hytrel® 3078 buffering to 1500 um.
125 um glass fiber with high temperature acrylate coating and Hytrel® 3078 buffering to 1500 um.
80 um glass fiber with acrylate coating and SE9058 buffering to 1500 um.
80 um glass fiber with high temperature acrylate coating and SE9058 buffering to 1500 um.
125 um glass fiber with acrylate coating and SE9058 buffering to 1500 um.
125 um glass fiber with high temperature acrylate coating and SE9058 buffering to 1500 um.
Both 80 um and 125 um glass fibers with acrylate, high temperature acrylate or polyimide coatings all with FBGs pre-written on, or spliced into, the fibers coated to 1500 um with Hytrel® 3078 or silicone SE9058.
80 um glass fiber with acrylate coating and Cytec Industries 80A Radcure polymer buffering to 1500 um.

The fiber diameter and coating thickness were selected based on analysis and prior work that indicated performance increased with coating thickness but at a decreasing rate, and that 80 um fiber has increased performance compared to 125 um fiber.

Hytrel® were extruded onto the fiber using commercially available and conventional thermoplastic extruders. Silicone was extruded onto the fiber using commercially available silicone thermoset extruders.

The Radcure polymer was coated onto the fiber using a conventional UV curable polymer coating process in which the fiber is pulled through a viscous liquid bath of the polymer to create a cone shape of polymer on the fiber, and subsequently exposed to a UV light source making a solid polymer on the fiber of the desired diameter.

Selected properties for the Hytrel® 3078, silicone SE9058 and UV cured polymer used as coatings are provided in Table 1.

TABLE 1

Selected Properties of Polymers

| Polymer | Density/ lbs in$^{-3}$ | Poisson's Ratio | Approx. Maximum Temp/° C. | Shear Modulus/ psi | Hardness/ Shore A |
|---|---|---|---|---|---|
| Hytrel ® 3078 | 0.0386 | 0.45 | 150 | 1358.86 | 80 |
| Silicone SE9058* | 0.0466 | 0.48 | 300 | 107.28 | 60 |
| 80A Radcure polymer | 0.0390 | 0.4995 | 120 | 772.40 | 80 |

*Press cure

Example 2: Testing of Coated Fibers

The Hytrel® and Radcure polymer coated fibers were each tested for acoustic sensitivity in a static calibration chamber. As the coating enhances both the static and dynamic strain in the cladded core of the optical fiber, the use of a static calibration test can greatly simplify obtaining a calibration of the acoustic sensitivity (commonly called Sensor Scale Factor). Accordingly, measuring the change in the fiber strain in a relatively simple static pressure chamber avoids the complexity and higher costs of conducting an acoustic sensor calibration in an anechoic chamber.

Briefly, the test chamber was constructed to accept wound optical fiber over a rigid mandrel to create a sensor. The chamber included a controlled water inlet and a controlled water outlet, such that water flow into and out of the chamber could be regulated allowing the creation of a balanced pressure within the chamber. Water flow through the system maintained the water temperature. The chamber was also outfitted with means to measure the chamber temperature, as well as means to measure and control the chamber pressure.

The coated fiber sensor was positioned inside the chamber and locked into place to create a sealed chamber. Both ends of the fiber were routed so they exited the chamber through pressure sealing fittings. The fiber was connected to a single channel interrogator.

The chamber was continuously filled with water to evacuate any air that may be trapped in the chamber and to allow the chamber temperature to normalize. Upon reaching steady-state pressure and temperature, a static calibration test was conducted measuring the performance of the particular coated fiber in the chamber.

The pressure inside the chamber was then increased and the coated fiber performance was re-measured. This process was repeated for multiple pressures, measuring the fiber performance at each pressure.

Figure 4:
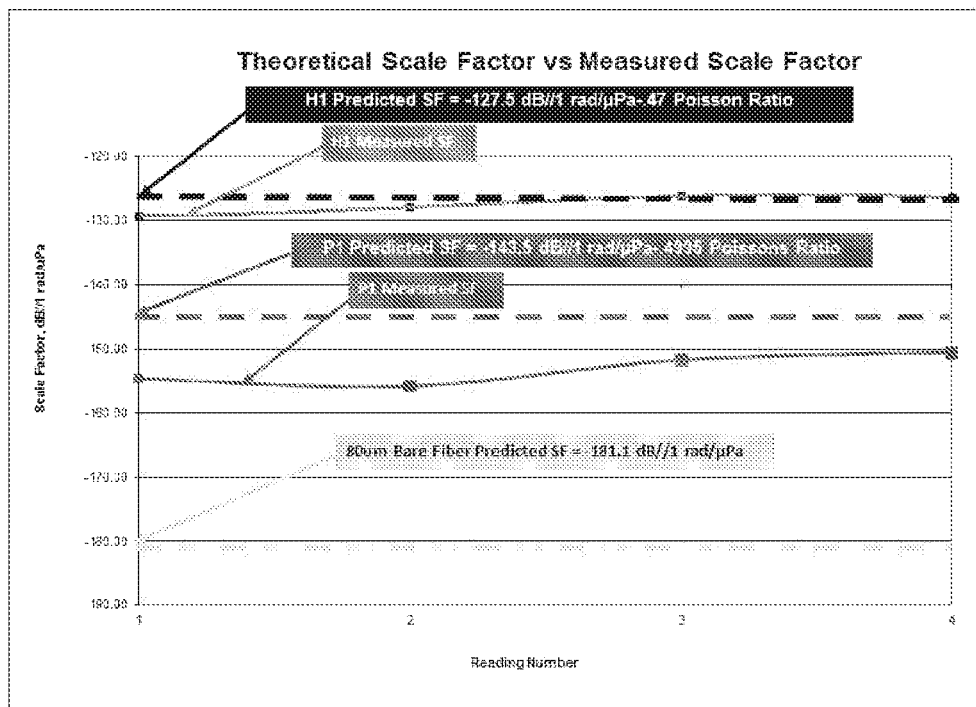
FIG. 4 presents a comparison of scale factors for optical fibers coated with Hytrel® 3078 (H1) and UV-cured urethane (P1) (test data) vs. bare fiber (calculated).
Figure 4:
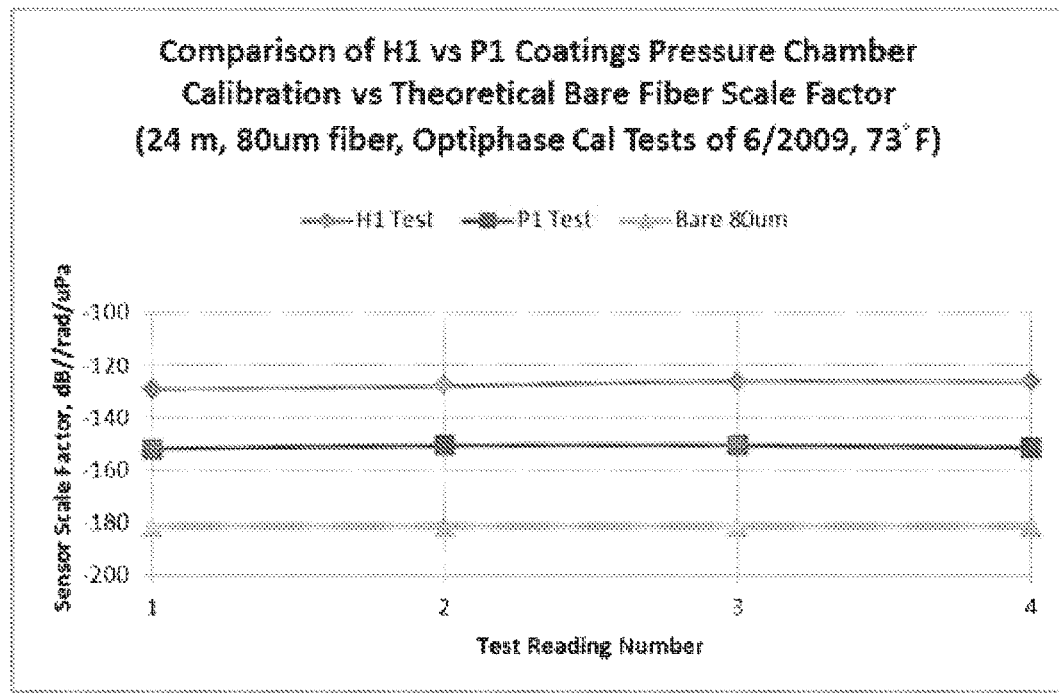

The results are shown in FIGS. 4A and B, which provides a comparison of measured acoustic sensitivities for the Hytrel® and UV cured polymer coated fibers together with analytical model-predicted acoustic sensitivity of bare fiber. The Hytrel® fiber coating (H1) measurements are seen to agree very closely with the Scale Factor prediction model (FIG. 4A). The UV cured polymer fiber coating (P1) measurements did not agree as closely with the predictions (FIG. 4A). This may be due to errors in the assumed material properties for P1. The Hytrel® coated fiber is shown to be over 50 dB more sensitive than the predicted sensitivity of a bare 80 µm fiber (FIGS. 4A and B), whereas the UV cured polymer coated fiber is shown to be approximately 25 dB more sensitive.

The Hytrel® and silicone SE9058 coated fibers were tested in downhole sensors and shown to retain good sensitivity under high temperature and pressure operating conditions.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:
1. A sensor system comprising:
a coated optical fiber, wherein the coated optical fiber comprises an optical fiber having a polymeric coating, the polymeric coating comprising a thermoset, thermoplastic or UV cured elastomer having a Poisson's Ratio of between about 0.350 and about 0.4995, and a shear modulus of between about 20 psi and about 2900 psi;
a light source;
a detector; and
a signal processor.

2. The sensor system according to claim 1, wherein the thermoset, thermoplastic or UV cured elastomer has a Shore A hardness of between about 20 and about 95.

3. The sensor system according to claim 1, wherein the Poisson's Ratio is less than about 0.490.

4. The sensor system according to claim 1, wherein the polymeric coating comprises a thermoset elastomer that is stable at operating temperatures up to about 300° C.

5. The sensor system according to claim 4, wherein the thermoset elastomer is a silicone.

6. The sensor system according to claim 1, wherein the polymeric coating comprises a thermoplastic or UV cured elastomer that is stable at operating temperatures up to about 150° C.

7. The sensor system according to claim 6, wherein the thermoplastic elastomer is a polyester-polyether copolymer.

8. The sensor system according to claim 7, wherein the thermoplastic elastomer is Hytrel® 3078.

9. The sensor system according to claim 6, wherein the UV cured elastomer is an aliphatic urethane acrylate, aromatic urethane acrylate, an epoxy acrylate, an acrylic acrylate, or a combination thereof.

10. The sensor system according to claim 1, wherein the coated fiber shows an increased Sensitivity Scale Factor of between about 5 dB and about 60 dB over bare fiber.

11. The sensor system according to claim 1, for use in detecting acoustic changes in a channel.

12. The sensor system according to claim 1, for use in geological exploration.

13. The sensor system according to claim 1, for use in seismic monitoring.

14. The sensor system according to claim 1, for use in security monitoring.

15. The sensor system according to claim 1, for use in nuclear explosion monitoring or leak detection.

16. The sensor system according to claim 1, for use in temperature measurement.

17. A method of producing a coated optical fiber having an increased Sensitivity Scale Factor of between about 5 dB and about 60 dB over bare fiber, the method comprising coating an optical fiber with a thermoset, thermoplastic or UV cured elastomer, the elastomer having a Poisson's Ratio of between about 0.350 and about 0.4995, and a shear modulus of between about 20 psi and about 2900 psi.

18. A system for detecting acoustic changes in a channel, the system comprising:
at least one coated optical fiber;
an interrogator optically coupled to the coated optical fiber; and
a signal processing device in communication with the interrogator,
wherein the coated optical fiber comprises an optical fiber having a polymeric coating, the polymeric coating comprising a thermoset, thermoplastic or UV cured elastomer having a Poisson's Ratio of between about 0.350 and about 0.4995, and a shear modulus of between about 20 psi and about 2900 psi.

19. The system according to claim 18, wherein the channel is a pipeline or a well-bore casing.

20. The system according to claim 19, wherein the acoustic changes are indicative of a leak in the pipeline or the well-bore casing.

* * * * *